E. A. IVATTS.
SELF LIGHTING KINEMATOGRAPHIC APPARATUS.
APPLICATION FILED APR. 8, 1912.
1,065,134.
Patented June 17, 1913.
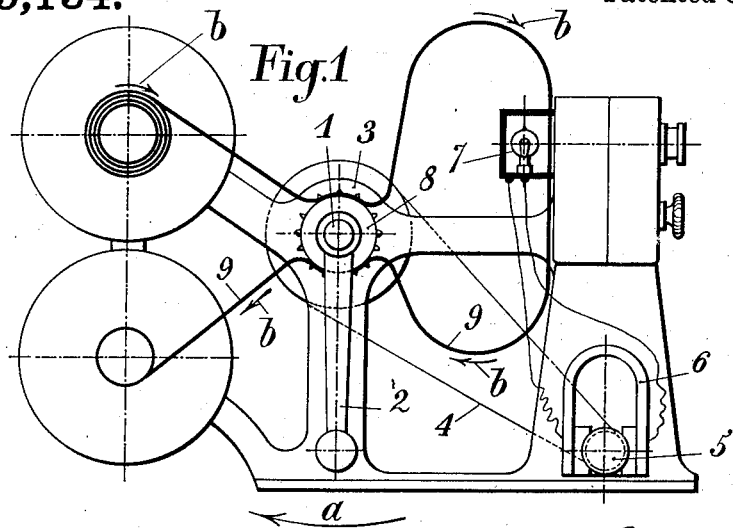
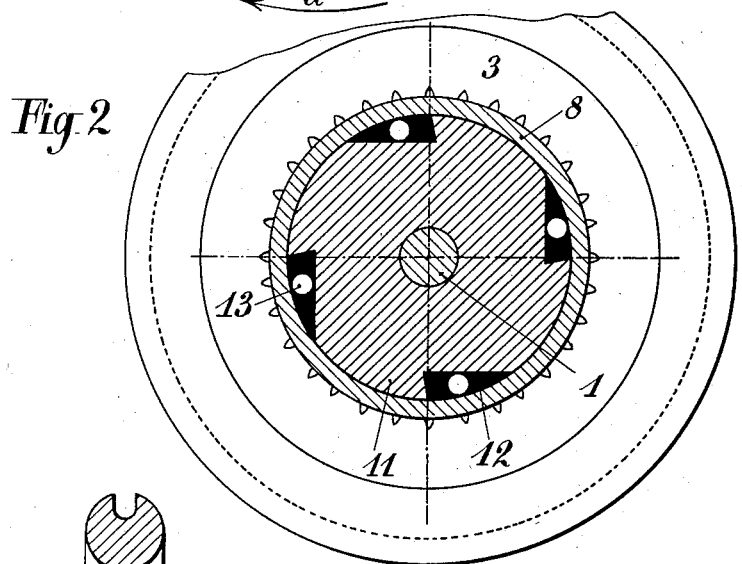
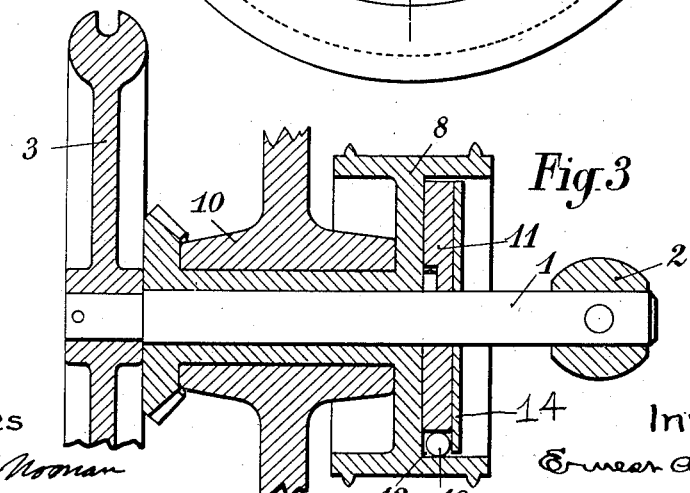
Witnesses
Inventor

UNITED STATES PATENT OFFICE.

ERNEST ALBERT IVATTS, OF PARIS, FRANCE, ASSIGNOR TO SOCIETY: COMPAGNIE GENERALE DE PHONOGRAPHES, CINEMATOGRAPHES ET APPAREILS DE PRECISION, OF PARIS, FRANCE.

SELF-LIGHTING KINEMATOGRAPHIC APPARATUS.

1,065,134.      Specification of Letters Patent.      Patented June 17, 1913.

Application filed April 8, 1912. Serial No. 689,313.

*To all whom it may concern:*

Be it known that I, ERNEST ALBERT IVATTS, citizen of Great Britain, residing at Paris, in the Department of the Seine, France, have invented certain new and useful Improvements in Self-Lighting Kinematographic Apparatus, of which the following is a specification.

This invention has reference to improvements in kinematographic projecting apparatus in which the necessary light for the projection is produced by the apparatus itself by means of an electric incandescent lamp fed by a small magneto or dynamo operated by means of the crank driving the mechanism that operates the film. With this kind of apparatus intended more particularly for private use or for educational purposes, it is not possible, as with the ordinary apparatus, temporarily to stop the movement of the film when it is desired that certain interesting portions of the projection can be regarded by the audience as a fixed projection.

The object of the present invention is to obtain this result with kinematographic projecting apparatus producing their own light.

It essentially consists in stopping the unwinding of the film while at the same time continuing to drive the dynamo or magneto supplying the current necessary for illuminating the temporarily fixed projection, this being effected by reversing the movement of the crank driving the mechanism which operates the film, and at the same time driving the magneto or dynamo. For this purpose any device which when reversed stops the movement of the film but at the same time continues to drive the dynamo or magneto may be employed for carrying out the present invention.

For the sake of example one may utilize the arrangement shown in the drawing attached to this descriptive memorandum in which:

Figure 1 is a side elevation of an apparatus producing its own light. Fig. 2 is a cross section of the driving mechanism. Fig. 3 is a diametral section of the same.

Referring to the drawings, 1 is the driving shaft to one end of which is fitted the crank 2, the pulley fly-wheel 3 being keyed to the other end and by intermediation of the belt 4 driving the rotor 5 of the dynamo 6 which supplies the current to the lamp 7.

The film feed drum 8 carrying the pins for engaging the film 9 is mounted loose on the driving shaft 1 and is supported by the frame 10 of the apparatus which serves as bearing. A disk 11 keyed to the shaft 1 and situated at the interior of the drum 8 is provided with a number of notches 12 in each of which is situated a ball 13. A flange 14 is afterward fixed to the said disk 11 so as to prevent the balls 13 escaping from their respective housings 12. According to this arrangement when the crank 2 is rotated in the direction of the large arrow *a* as shown in Fig. 1 it will occasion the simultaneous rotation of the fly-wheel pulley 3 and the driving drum 8 wedging the balls 13 against the said drum, whereby the film 8 will be rotated in the direction indicated by the small arrows *b*.

When it is desired temporarily to obtain the fixed production of one picture of the film 9 it will suffice to turn the crank 2 in opposite direction to that indicated by the arrow. Instantly owing to the unwedging of the balls 13, the drum 8 as well as the film 9 will be stopped, only the fly-wheel 3 will continue to rotate although in opposite direction; but this has no injurious effect on the production of the electric current. Any system of framing the film permitting of framing the picture of which it is desired to obtain a fixed projection may be employed in this improved apparatus.

Having now particularly described and ascertained the nature of my invention, I declare that what I claim is:

1. In kinematographic projecting apparatus, an electric generator, a film-actuating shaft arranged to drive said generator, an electric light for illuminating the film, electric connections between the light and generator, and means for enabling the movement of said film to be temporarily arrested by reversing the direction of rotation of said shaft, with but momentary interruption of the generation of lighting current.

2. In kinematographic projecting apparatus, an electric generator, a shaft for driving it, an electric light for illuminating the film, electric connections between the light and generator, a film-actuating element, and means whereby said shaft will actuate said element when rotated in one direction only.

3. In kinematographic projecting apparatus, an electric generator, a shaft for driving it, an electric light for illuminating the film, electric connections between the light and generator, a film-actuating element, and a clutch between said shaft and said element adapted to be engaged when said shaft is rotated in one direction only, and to be disengaged when it is turned backward.

4. In kinematographic projecting apparatus, an electric generator, a shaft for driving it, an electric light for illuminating the film, electric connections between the light and generator, a film-actuating drum loosely mounted on said shaft, and a clutch engaging with said drum to rotate it in one direction only, and to allow it to remain stationary when said shaft is turned backward.

In testimony whereof I affix my signature in presence of two witnesses.

ERNEST ALBERT IVATTS.

Witnesses:
CAIUS DANZER,
LUCIEN CRESPIN.